(12) United States Patent
Hoover

(10) Patent No.: US 10,423,146 B2
(45) Date of Patent: Sep. 24, 2019

(54) CARRIAGE WITH TWO-PIECE HOUSING

(71) Applicant: SCHAEFFLER TECHNOLOGIES AG & CO. KG, Herzogenaurach (DE)

(72) Inventor: Jason Hoover, Charlotte, NC (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 29 days.

(21) Appl. No.: 15/879,703

(22) Filed: Jan. 25, 2018

(65) Prior Publication Data

US 2019/0227516 A1  Jul. 25, 2019

(51) Int. Cl.
| | |
|---|---|
| *F16C 29/06* | (2006.01) |
| *G05B 19/402* | (2006.01) |
| *G05B 19/404* | (2006.01) |
| *B23Q 1/54* | (2006.01) |
| *B23Q 1/62* | (2006.01) |

(52) U.S. Cl.
CPC ......... *G05B 19/402* (2013.01); *B23Q 1/5418* (2013.01); *B23Q 1/626* (2013.01); *G05B 19/404* (2013.01); *G05B 2219/49271* (2013.01)

(58) Field of Classification Search
CPC ........ F16C 29/068; F16C 29/02; F16C 29/04; F16C 29/0602; F16C 29/069; F16C 33/067; Y10T 403/49; Y10T 403/4949; Y10T 403/4966; B23Q 1/5418; B23Q 1/62
USPC ................. 384/9, 16, 24, 29–32, 41, 43, 44
See application file for complete search history.

(56) References Cited

U.S. PATENT DOCUMENTS

| | | | | |
|---|---|---|---|---|
| 642,630 | A * | 2/1900 | Richards | F16C 29/04 384/30 |
| 2,382,826 | A * | 8/1945 | Somes | H05B 6/101 266/129 |
| 4,005,913 | A * | 2/1977 | Thomson, Jr. | F16C 29/001 184/5 |
| 4,264,112 | A * | 4/1981 | Magnuson | F16C 29/008 384/29 |
| 4,480,879 | A * | 11/1984 | Reith | F16C 29/0688 384/43 |
| 4,815,862 | A * | 3/1989 | Mugglestone | F16C 29/0616 384/43 |
| 4,995,734 | A * | 2/1991 | Schroeder | F16C 29/00 384/29 |
| 5,033,869 | A * | 7/1991 | Kingston | F16C 29/02 384/13 |
| 5,352,044 | A * | 10/1994 | Jordens | B60G 21/0551 384/140 |
| 6,186,664 | B1 * | 2/2001 | Yamazaki | F16C 29/0688 384/43 |
| 6,685,381 | B1 * | 2/2004 | Sugita | B60G 9/00 280/124.152 |
| 8,998,490 | B2 * | 4/2015 | Ng | F16C 35/00 384/43 |

(Continued)

*Primary Examiner* — Thomas R Hannon
(74) *Attorney, Agent, or Firm* — Brooks Kushman P.C.

(57) ABSTRACT

A carriage assembly includes a housing having first and second pieces each defining a recess that has a bearing surface with raised dimples. The first and second pieces are assembled to each other such that the recesses are aligned to form a cylindrical hole. A bushing is received in the hole and has an outer surface disposed against the dimples of the first and second pieces. The dimples are deformed during assembly to secure and locate the bushing within the cylindrical hole.

18 Claims, 3 Drawing Sheets

(56) References Cited

U.S. PATENT DOCUMENTS

2009/0016657 A1    1/2009  Northrup et al.
2015/0176644 A1*  6/2015  Ng .......................... F16C 35/00
                                                  384/44

\* cited by examiner

CARRIAGE WITH TWO-PIECE HOUSING

TECHNICAL FIELD

The present disclosure relates to carriages for integrated linear systems, and more specifically to carriages having two-piece housings.

BACKGROUND

Integrated linear systems may be used in manufacturing and other fields to control movement of a tool or other device in the X, Y, and/or Z planes. An example XY linear system may include a table having a linear actuator for movement in the X direction and another linear actuator for movement in the Y direction. A carriage is operably coupled to the linear actuators so that the carriage can be moved to any Cartesian position, i.e., (X,Y), on the table.

SUMMARY

According to one embodiment, a carriage assembly includes a housing having first and second pieces each defining a recess that has a bearing surface with raised dimples. The first and second pieces are assembled to each other such that the recesses are aligned to form a cylindrical hole. A bushing is received in the hole and has an outer surface disposed against the dimples of the first and second pieces. The dimples may be deformed during assembly to secure and locate the bushing within the cylindrical hole.

According to another embodiment, a carriage assembly includes a first housing piece having a first surface. The first housing piece includes a first half-moon recess extending into the first surface and having a bearings surface with a first array of raised dimples. A second housing piece of the carriage assembly includes a second surface and a second half-moon recess extending into the second surface and having a bearings surface with a second array of raised dimples. The first and second housing pieces are assembled to each other with the first and second surfaces engaging and with the first and second recesses aligned to form a cylindrical hole. A cylindrical bushing is received in the hole and includes an outer surface disposed against the dimples of the first and second arrays.

According to yet another embodiment, a method of assembling a carriage assembly is presented. The method includes providing a first housing piece defining a first recess that has a bearing surface with a first set of raised dimples, and installing a bushing into the first recess with an outer surface of the bushing disposed against the first set of raised dimples. The method further includes assembling a second housing piece, that defines a second recess having a bearing surface with a second set of raised dimples, onto the first housing piece to assemble a housing. The pieces are assembled such that the recesses are aligned to form a hole extending through the housing and such that the bushing is disposed in the second recess with the outer surface of the bushing disposed against the second set of raised dimples. The method also includes compressing the first and second pieces towards each other to deform the dimples of the first and second sets against the outer surface creating an interference fit between the dimples and the bushing.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
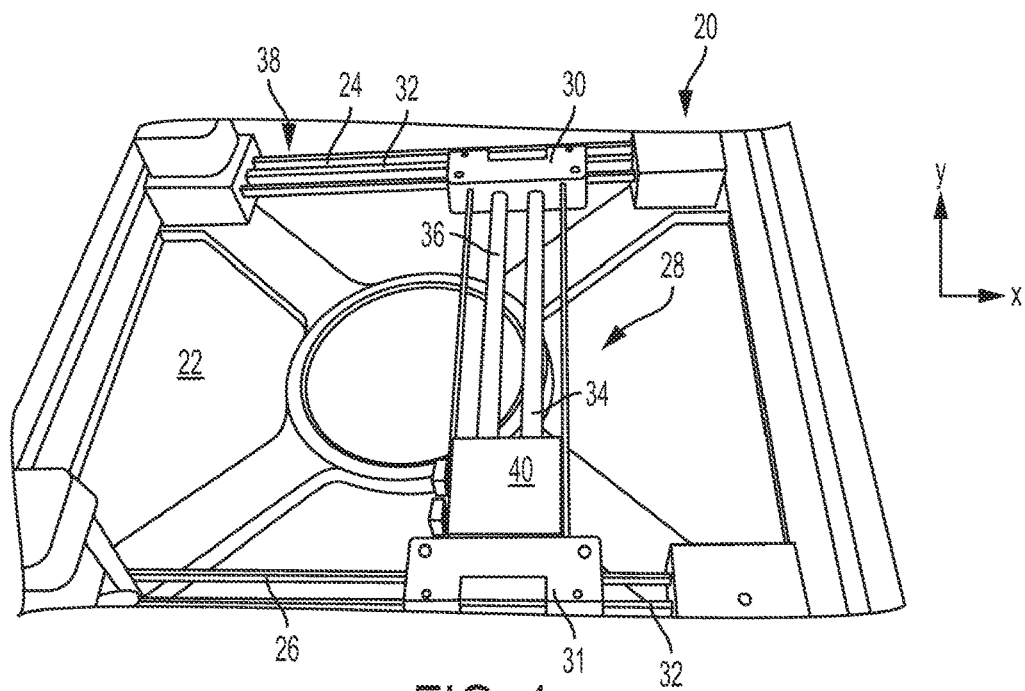
FIG. 1 is a perspective view of an integrated linear system.

Referring to FIG. 1, an integrated linear system 20 may include a platform 22 having first linear actuators 24 and 26 for creating movement in the X direction. Each of the first linear actuators 24, 26 includes a support rod 32. A second linear actuator 28 creates movement in the Y direction. The second linear actuator 28 may include a pair of supports 30 and 31 that attach the second linear actuator to the rods 32 of the first linear actuators 24, 26. A pair of rods 34 and 36 extend between the supports 30 and 31. A carriage 40 is supported on the rods 34 and 36.

The supports 30, 31 are slidably received on their respective rods 32 so that the second linear actuator 28 can slide in the X direction. Similarly, the carriage 40 may slide on the rods 34 and 36 to move the carriage 40 in the Y direction. The integrated linear system 20 may include at least one drive system 38 that actuates the second linear actuator 28 along the rods 32 and actuates the carriage 40 along the rods 34 and 36. The drive system 38 may be a belt-drive system. The belt-drive system 38 is operable to place the carriage 40 in a desired Cartesian position on the platform.

The carriage 40 is configured to support a tool or other device (not shown) for performing work on the platform 22. A third linear actuator (not shown) may be mounted on the carriage 40 to enable movement in the Z direction. Another carriage may be mounted on the third linear actuator to support a tool or other device.

Typically, carriages are formed of a solid metal housing and bores are machined through the housing to receive the rods therethrough. To reduce friction between the carriage and the rods, many carriages included ball bushings that are press fit into the bores. The press-fit ball bushings require tight tolerances for the bores, which increases production costs of the carriages. It also limits the types of materials that may be used to form the housing of the carriage.

The carriage 40 has a two-piece housing that does not require bore-hole machining and subsequent press fitting of bushings, which reduces the manufacturing costs of the carriage. The following figures and related text describe the carriage 40 in more detail.

Figure 2:
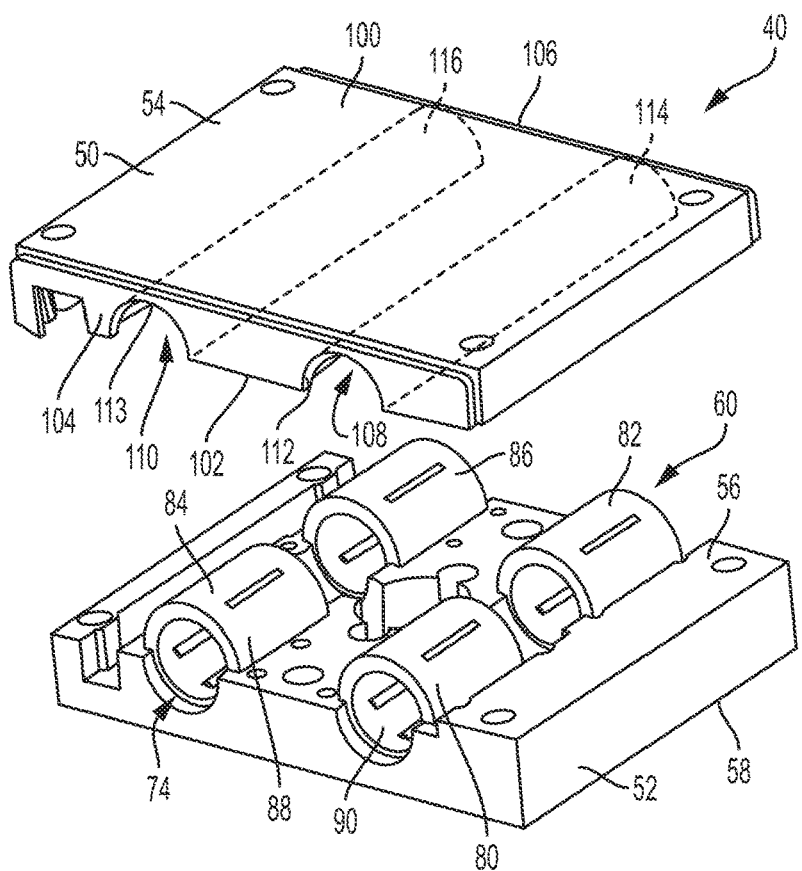
FIG. 2 is an exploded perspective view of a carriage.
Figure 3:
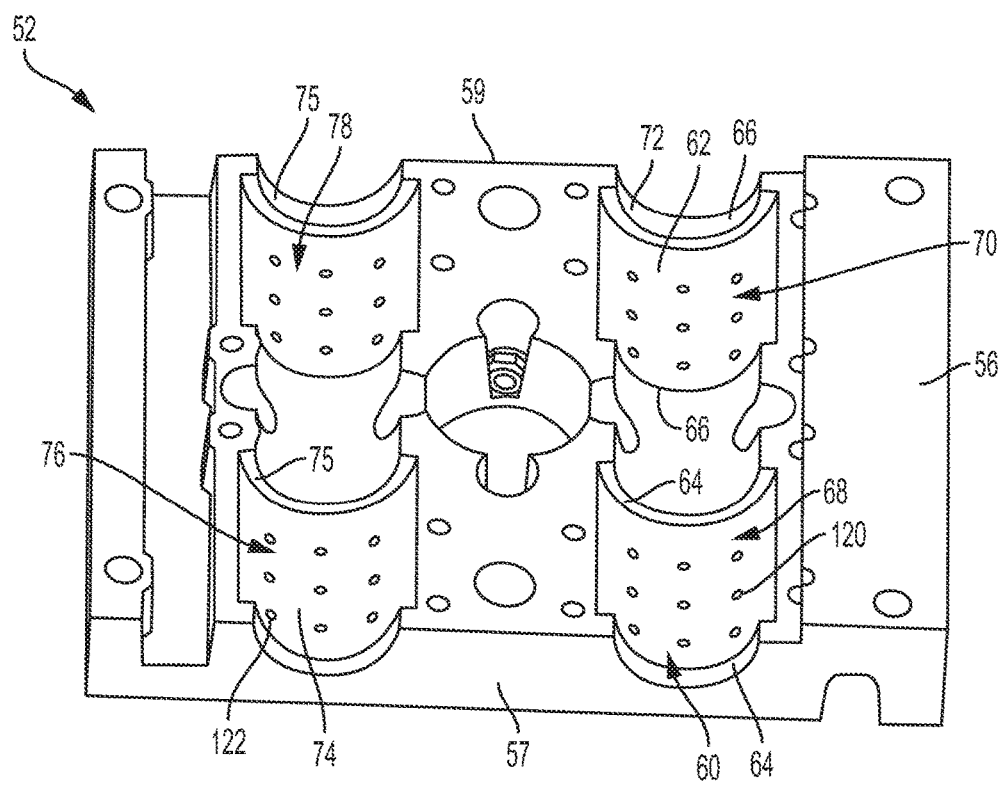
FIG. 3 is a perspective view of a lower piece of the carriage.

Referring to FIGS. 2 and 3, the carriage 40 includes a two-piece housing 50 having a lower piece 52 and an upper piece 54 that are assembled together to form the housing. The upper and lower pieces 52, 54 may be referred to as housing halves. The term "halves" does not imply that the two halves are identical or that each forms exactly half of the housing. For example, the ratio between the upper and lower pieces may be 50-50, 45-55, 40-60, etc. In the illustrated orientation, the lower piece 52 includes top 56 and a bottom 58. A first half-moon recess 60 is formed into the top 56 and extends between a first side 57 and a second side 59 of the lower piece 52. The recess may have other shapes and is not limited to half-moons. The recess 60 defines a bearing surface 62 and one or more partitions extending from the bearing surface 62. For example, the first half-moon recess 60 may include a first pair of partitions 64 that are spaced apart to define a first bushing-receiving area 68, and a second pair of partitions 66 spaced apart to define a second bearing-receiving area 70. The partitions may be an annular wall 72 that is raised above the bearing surface 62.

A second half-moon recess 74 is also formed into the lower piece 52. The second half-moon recess 74 may also include partitioning walls 75 that cooperate to define a third bushing-receiving area 76 and a fourth bushing-receiving area 78. The first and second recesses 60, 74 may be the same.

One or more cylindrical bushings are disposed within the half-moon recesses 60, 74. For example, a first bushing 80 is disposed in the first receiving area 68, a second bushing 82 is disposed in the second receiving area 70, a third bushing 84 is disposed in the third receiving area 76, and a fourth bushing 86 is disposed in the fourth receiving area 78. Each of the bushings includes an outer surface 88 (outer diameter) that is disposed against the bearing surface 62 and an inner surface 90 (inner diameter). The inner surface 90 defines a hole extending through the bushing and configured to receive one of the rods 34, 36. In one or more embodiments, the bushings are ball bushings that include bearing elements disposed on the inner surface 90. The bearing elements reduce friction between the rods and the bushings.

The upper piece 54, in the illustrated orientation, includes a top 100, a bottom 102, a first side 104, and a second side 106. Similar to the lower piece 52, the upper piece 54 includes a first half-moon recess 108 and a second half-moon recess 110 that each extend between the sides 104 and 106. The upper piece 54 may also include partitioning walls 112 and 113 that cooperate to define bushing receiving areas of the first and second half-moon recess 108, 110, respectively. The first and second half-moon recess 108, 110 of the upper piece 54 may be the same or similar to the half-moon recess 60, 74 of the lower piece 52. The upper and lower pieces 52, 54 are configured such that, when assembled together, the first half-moon recess 60 aligns with the first half-moon recess 108 to form a first cylindrical hole 114, the second half-moon recess 74 aligns with the second half-moon recess 110 to form a second cylindrical hole 116. The partitioning walls 112 and 113 of the upper piece 54 align with the partitioning walls 64, 75 and cooperate to secure the bushings 80 and 82 within the first hole 114 and the bushing 84 and 86 within the second hole 116. The petitioning walls cooperate to axially restrain the bushings within the holes.

The bearing surface 62 of the first half-moon recess 60 may include a textured surface. For example, the textured surface may include a plurality of raised dimples 120. The raised dimples 120 may be disposed in the bearing receiving portions 68 and 70. The dimples 120 may have a cylindrical, spherical, or other shape. The dimples 120 protrude from the bearing surface 62 to engage with the outer surfaces 88 of the bushings 80, 82. The dimples 120 may protrude such that a top of each of the dimples 120 is raised between 0.07 and 0.25 millimeters 0.003 and 0.010 inches) from the bearing surface 62. The dimples 120 may be arranged in an array having a specific pattern. For example, the dimples 120 are arranged in a grid having a series of columns that extend axially with respect to the hole 114 and a series of rows that extend circumferentially. In the illustrated embodiment, the grid is 3×3. The bearing surface of the second half-moon recess may include dimples 122. The dimples 122 may be the same as dimples 120 and may be arranged in an array having a same or similar shape. The first half-moon recess 108 and the second half-moon recess 110 of the upper piece 54 may also include dimples (not shown) that are the same or similar to dimples 120. The dimples may be arranged to have a dimple density between 0.78 and 2.33 dimples per square centimeter (5 and 15 dimples per square inch), inclusive.

The pieces 52 and 54 of the housing 50 may be injection molded, 3D printed, or otherwise formed, to have all of the above-described features formed with the pieces so that secondary machining is minimal. This substantially reduces the cost of the housing 50 as compared to the singular, machined press-fit housing of the typical carriage. In one embodiment, the pieces 52 and 54 are injection molded parts formed of Delrin® 500p.

In order to press fit bushings into a bore, the bore must be machined to a high-degree of precision. This degree of precision is difficult to achieve in injection-molded parts such as the lower piece 52 and the upper piece 54. The dimples serve as a substitute for the above-described press fit used to secure the bushings. The dimples not only grip but also maintain proper concentricity of the cylindrical bushings 80, 82, 84, and 86 within the holes 114, 116. The dimples are configured to deform (crush) against the bushings when the upper and lower pieces 54, 52 are assembled to each other. The individual dimples can deform by varying amounts; thus, the tolerance for the first and second holes 114, 116 are not as stringent as the tolerance of press-fit components.

Figure 4:
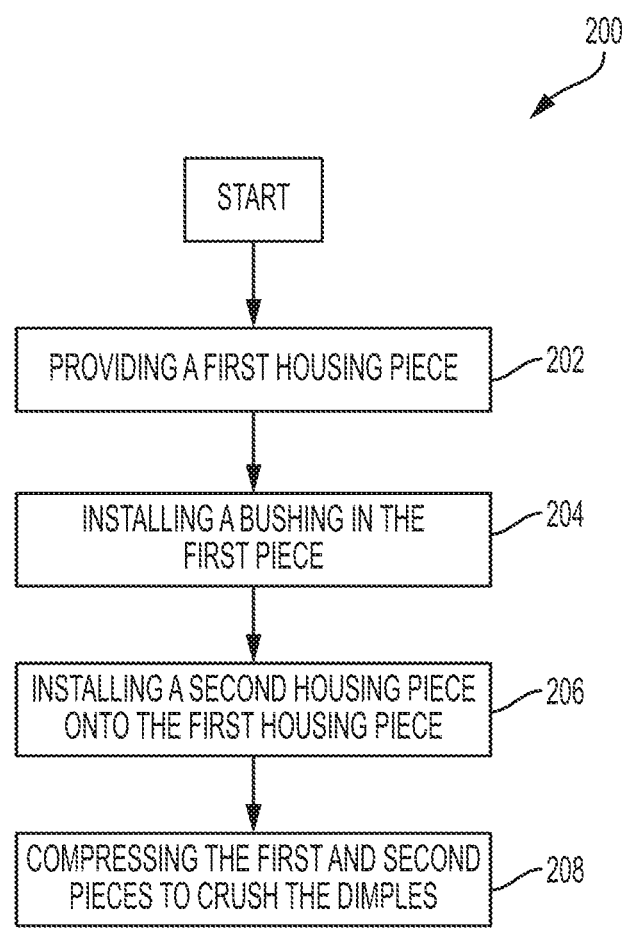
FIG. 4 is a flow chart showing a method of assembly for the carriage.

FIG. 4 illustrates a method 200 of assembling the carriage 40. The method 200 includes providing a first housing piece defining a first half-moon recess that has a bearing surface with at least a first set of raised dimples at step 202. At step 204, at least one cylindrical bushing is installed into the first half-moon recess with an outer surface of the bushing disposed against the first set of raised dimples. A second housing piece, that defines a second half-moon recess having a bearing surface with a second set of raised dimples, is installed onto the first housing piece such that the recesses are aligned to form a cylindrical hole and such that the bushing is disposed in the second recess with the outer surface of the bushing disposed against the second set of raised dimples at step 206. Once the first and second housing are loosely assembled, the first and second pieces are compressed towards each other to crush the dimples of the first and second sets against the outer surface of the bushing creating an interference fit between the dimples and the bushing at step 208. The housings may be secured together by fasteners that compress the pieces as they are tightened. Once the carriage is assembled, the carriage can be mounted to a linear system or other final use of the carrier.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated.

What is claimed is:

1. A carriage assembly comprising:
a housing including first and second pieces each defining a recess that has a bearing surface with raised dimples, the recess of the first piece having a partition extending from the bearing surface and engaging with the bushing to restrict axial movement of the bushing within the hole, wherein the first and second pieces are assembled to each other such that the recesses are aligned to form a cylindrical hole; and
a bushing received in the hole and including an outer surface disposed against the dimples of the first and second pieces.

2. The carriage assembly of claim 1, wherein the recess is arcuate.

3. The carriage assembly of claim 2, wherein the recess includes a partition that is arcuate, and wherein the bushing defines an inner diameter, and an inner diameter of the partition is greater than the inner diameter of the bushing.

4. The carriage assembly of claim 1, wherein the recess of the first piece includes a first pair of walls extending from the bearing surface and defining a first bushing-receiving area, and a second pair of walls extending from the bearing surface and defining a second bushing-receiving area, wherein the bushing is disposed in the first bushing-receiving area, and further comprising an additional bushing disposed in the second bushing-receiving area.

5. The carriage assembly of claim 4, wherein the recess of the second piece includes a first pair of walls extending from the bearing surface and defining a third bushing-receiving area, and a second pair of walls extending from the bearing surface and defining a fourth bushing-receiving area, wherein the bushing is disposed in the third bushing-receiving area, and the additional bushing disposed in the fourth bushing-receiving area.

6. The carriage assembly of claim 1, wherein the dimples are cylindrical or spherical.

7. The carriage assembly of claim 1, wherein the housing is formed of plastic.

8. The carriage assembly of claim 1, wherein a top of each of the dimples is raised between 0.07 and 0.25 millimeters from an associated one of the bearing surfaces.

9. The carriage assembly of claim 1, wherein the first and second pieces each define an additional recess that has a bearing surface with raised dimples, the first and second pieces being assembled to each other such that the additional recesses are aligned to form a second cylindrical hole, and further comprising a second bushing received in the second hole.

10. The carriage assembly of claim 1, wherein each of the dimples are partially deformed.

11. A carriage assembly comprising:
a first housing piece including a first surface and a first half-moon recess extending into the first surface and having a bearings surface with a first array of raised dimples;
a second housing piece including a second surface and a second half-moon recess extending into the second surface and having a bearings surface with a second array of raised dimples, wherein the first and second housing pieces are assembled to each other with the first and second surfaces engaging and with the first and second recesses aligned to form a cylindrical hole; and
a cylindrical bushing received in the hole and including an outer surface disposed against the dimples of the first and second arrays, wherein the dimples of the first and second arrays are partially deformed to create an interference fit between the dimples and the bushing.

12. The carriage assembly of claim 11, wherein a pattern of the first array matches a pattern of the second array.

13. The carriage assembly of claim 11, wherein the first half-moon recess further has a partition extending from the bearing surface and engage with the bushing to restrict axial movement of the bushing within the hole.

14. The carriage assembly of claim 11, wherein the first half-moon recess further has a pair of walls axially spaced and extending from the bearing surface to define a bushing-receiving area, and wherein the bushing is disposed in the bushing-receiving area.

15. A method comprising:
providing a first housing piece defining a first recess that has a bearing surface with a first set of raised dimples;
installing a bushing into the first recess with an outer surface of the bushing disposed against the first set of raised dimples;
assembling a second housing piece, that defines a second recess having a bearing surface with a second set of raised dimples, onto the first housing piece to assemble a housing, wherein the pieces are assembled such that the recesses are aligned to form a hole extending through the housing and such that the bushing is disposed in the second recess with the outer surface of the bushing disposed against the second set of raised dimples; and
compressing the first and second pieces towards each other to deform the dimples of the first and second sets against the outer surface creating an interference fit between the dimples and the bushing.

16. The method of claim 15 further comprising installing a rod through the bushing.

17. The method of claim 15, wherein the first and second pieces are compressed by installing fasteners through the first and second pieces, and tightening the fasteners to deform the dimples of the first and second sets.

18. The method of claim 15, wherein the first and second recesses are arcuate.

* * * * *